May 26, 1953 B. LIEBOWITZ 2,639,842
METHOD AND APPARATUS FOR THE MANUFACTURE OF COLLARS
Filed Jan. 24, 1950 3 Sheets-Sheet 1

INVENTOR.
BENJAMIN LIEBOWITZ
BY
Kenyon & Kenyon
ATTORNEYS

May 26, 1953  B. LIEBOWITZ  2,639,842
METHOD AND APPARATUS FOR THE MANUFACTURE OF COLLARS
Filed Jan. 24, 1950  3 Sheets-Sheet 2

INVENTOR.
BENJAMIN LIEBOWITZ
BY Kenyon & Kenyon
ATTORNEYS

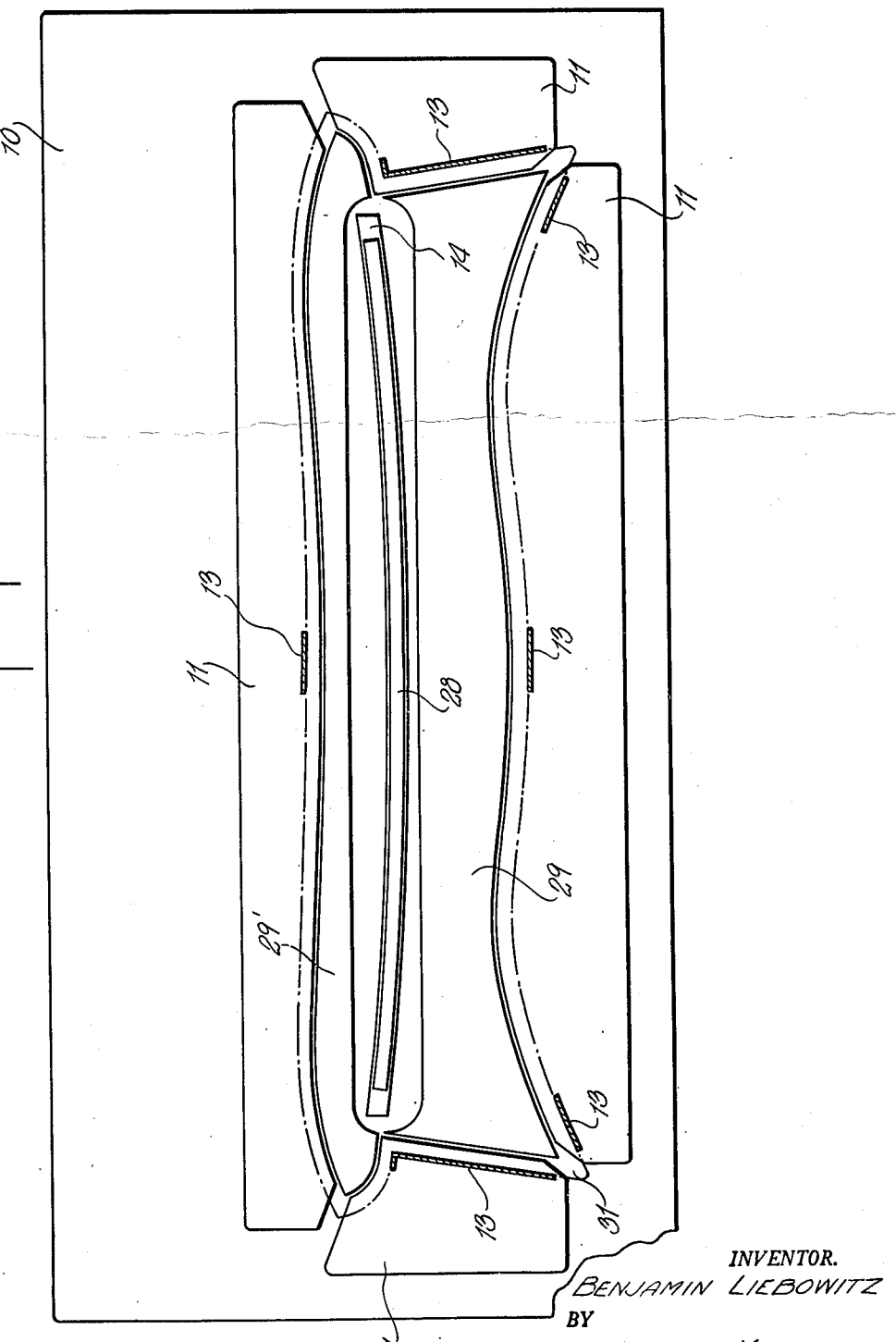

Patented May 26, 1953

2,639,842

UNITED STATES PATENT OFFICE 2,639,842

METHOD AND APPARATUS FOR THE MANUFACTURE OF COLLARS

Benjamin Liebowitz, Lewisboro, N. Y., assignor to Trubenizing Process Corporation, New York, N. Y., a corporation of New York Application January 24, 1950, Serial No. 140,245

10 Claims. (Cl. 223—2)

This invention relates to the manufacture of garment parts, particularly collars, and has for its general objective the provision of improved method and apparatus for effecting such manufacture. This invention is particularly suitable for the manufacture of one piece collars. The constituent parts of a collar are generally referred to as the band portion and the collar top portion. The collar top portion is also frequently referred to as the cape portion or the foldover portion. In a one piece collar the band portion and the collar top portion are cut in one piece.

In my copending application Serial No. 79,758 filed March 5, 1949, I have disclosed improved method and apparatus for the manufacture of collars and similar articles of apparel. A collar generally consists of three plies of fabric which are referred to herein as the "face ply," the "lining ply" and the "back ply" respectively. As pointed out in my aforesaid application Serial No. 79,758, it has been the general practice to cut the plies for the collar top portion and for the collar band portion separately, and to provide a seam between the collar top and collar band portions which requires stitching through nine plies of fabric. It has also been pointed out in my aforesaid application that the resulting bulky seam is often uncomfortable and requires such high stitching tensions that serious difficulties have been encountered because of the resulting tendency of the stitching to shrink the collar during laundering, and because such shrinkage is variable depending upon variations in laundering conditions. Moreover, serious difficulties also have encountered from the point of view of producing such collars so as to have accurate dimensions. It also has been pointed out in my aforesaid copending application that in the past, attempts have been made to eliminate the bulky seam by cutting the fabric plies constituting the collar to the shape of the whole collar instead of cutting the collar top and collar band portions separately, thus producing a so-called one piece collar. However, except for "sport" collars where high precision is not demanded such previous attempts have had little success because manufacturing tolerances have been too large to allow for adequate precision in the finished collar. Moreover, such one piece collars have presented difficulties in that there is no guide for locating the foldline between the collar band and collar top portions, such as that provided by the seam in the case of a two piece collar, with the result that when a one piece collar is laundered the foldline more likely than not does not have the proper location.

As likewise mentioned in my aforesaid copending application, one piece collars and the tops of ordinary two piece collars are generally made by the method known as "running and turning." According to this method, the three plies of the collar are superimposed with the face ply in the middle. The plies are then run, i. e., stitched around three sides of the outline required in the finished collar, the assembly thereafter being "turned" inside out, thus bringing the face ply to the outside and the interlining ply inside. During turning, the plies hinge approximately around the running stitch.

In my aforesaid copending application, I have disclosed improved method and apparatus which is more particularly applicable to the manufacture of collars or the like by the "running and turning method.

In addition to the "running and turning" method, there is another method which is applicable to the manufacture of collars or the like and which is known as "machine turning." According to the "machine turning" method, the raw edges of the collar plies are turned over the edge of a templet by means of a machine. The "machine turning" method, to the extent that it has been used, has been used in the manufacture of detached, i. e., separate collars, but is not currently used to any material extent in the manufacture of attached collars.

It is an objective of this invention to provide improved method and apparatus for making garment parts comprising foldline-forming means using the techniques of the "machine turning" method. It is an especial object of this invention to provide improved method and apparatus for the manufacture of one piece collars so as to eliminate the objectionable collar band seam that is characteristic of conventional two piece collars, while at the same time providing a foldline along which the collar will turn naturally and automatically after repeated launderings. It is a further objective of this invention to provide method and apparatus whereby appropriate foldline-forming means may be applied so as to be accurately located in predetermined spaced relation to the peripheral contours of the finished collar as determined by "machine turning." Further objectives of this invention relate to method and apparatus whereby one piece collars or the like may be rapidly and economically produced.

The nature of this invention will be better understood by the following description of method and apparatus which exemplifies the practice of my invention in connection with the accompanying drawings, wherein:

Fig. 4 is a plan view of the apparatus taken on the line 4—4 of Fig. 3, but with certain portions removed for affording better clarity of the showing and with the turning plates shown in retracted position.

Figure 1:
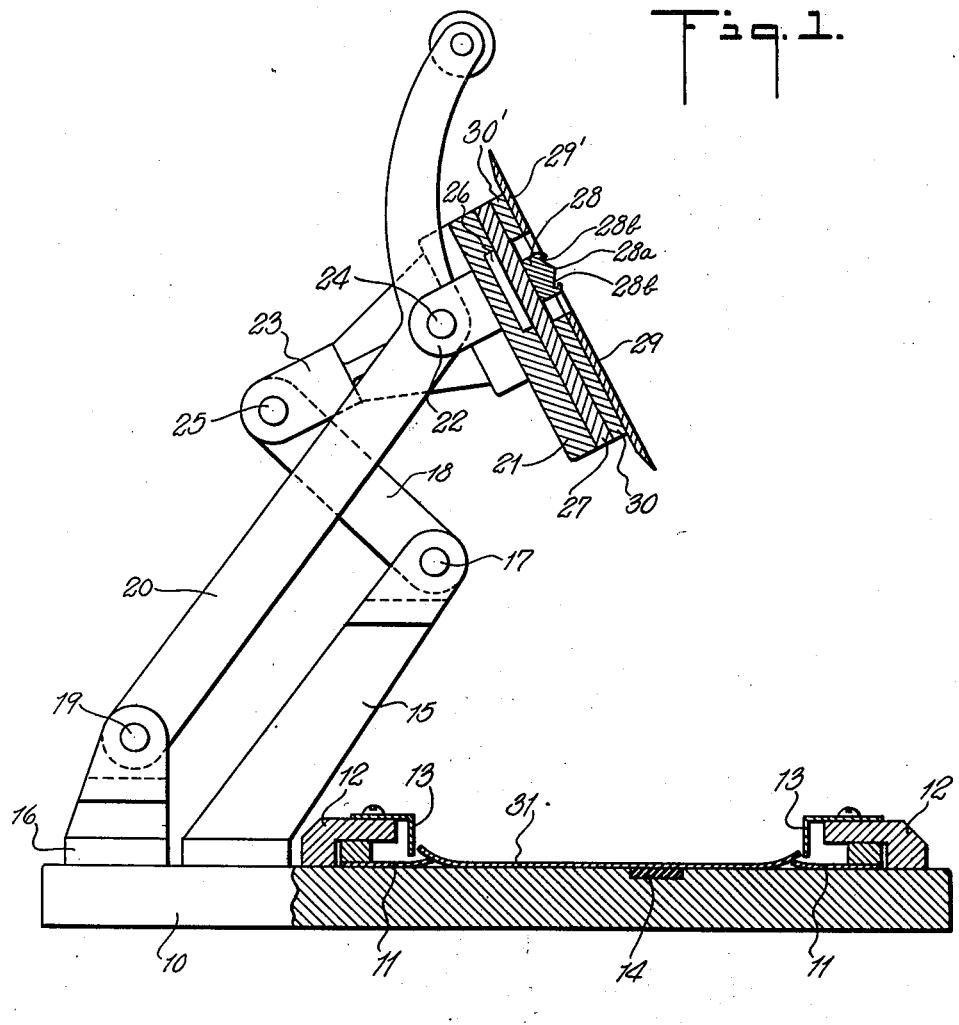
Fig. 1 is an end elevation of apparatus embodying this invention with certain parts thereof shown in section, the apparatus being shown in open position.

In the drawings, the bed of the machine is indicated by the reference character 10. The turning plates 11 are slidably mounted on the bed 10 and in turn have pressure applied thereto by the pressure frame 12 which is secured to the bed 10 by any suitable means not shown. Carried by the pressure frame 12 are the gauging means 13 to guide the operator in placing the work in the machine. These gauging means are located so as to correspond to the peripheral contour of the raw edges of the work which, in the embodiment shown, is a collar ply appropriate for a one piece collar. The turning plates 11 are slidably mounted so as to be movable between the retracted position shown in Figs. 1 and 4 and the advanced position shown in Figs. 2 and 3. No mechanism is shown for moving the pressure plates 11 between the advanced and retracted positions inasmuch as various well-known mechanisms may be employed for accomplishing such movements of the turning plates. Moreover, no means is shown for applying heat to the bed plate inasmuch as any conventional heating means may be employed. More generally, in the interest of clarity and simplification, the drawings are to a substantial extent schematic in that a number of the non-essential details of the kind familiar to anyone skilled in the art, such as those mentioned above, as well as details in the nature of screws, bolts and the like, for securing certain of the parts together, have not been shown.

The general arrangement thus far described of the machine bed, turning plates, pressure frame and gauging means is illustrative of conventional apparatus used in the "machine turning" method.

According to my invention as compared with older machines for accomplishing "machine turning" a special type of head mechanism is employed which is novel both with regard to its construction and operation and with regard to the provision thereon of means for applying foldline-forming means in predetermined location to the work acted upon by the machine. A typical embodiment of such head mechanism will be described below. For use in combination with the new type of head mechanism, the bed 10 is also modified by the insertion of a strip 14 of yieldable resilient material into a slot cut in the bed so as to receive it. The function of this strip 14 of yieldable resilient material will be apparent from the description which follows.

The head mechanism is supported by a bracket 15 and a pair of brackets 16 which are rigidly mounted on the bed 10. At the upper end of the bracket 15 is a pivot 17 on which is rotatably mounted a short link 18. Each of the brackets 16 carries a pivot 19 on which, respectively, each of the long links 20 can rotate. The main head consists of a casting 21 from which protrudes the pair of short arms 22 and the longer arm 23. Each of short arms 22 carries pivot pin 24 around which the long links 20 may respectively rotate. The longer arm 23 carries the pin 25 around which the short link 18 may rotate. The effect of this linkage is to cause the main head 21 to rotate from the horizontal position shown in Figs. 2 and 3 to a position past the vertical as shown in Fig. 1. Each of the links 20 has an extension 33 between which the handle 34 is disposed which can be grasped by the operator whereby the raising and lowering of the head 21 may be readily accomplished.

The head 21 is grooved to receive a heating element 26 which is held in position by the plate 27 as shown. The heating element may be an electric heating element connected to a source of electric power not shown. The plate 27 carries the applicator 28 for applying foldline-forming means to a collar ply in a manner which will be described below. The plate 27 also carries the divided templet 29—29' which is spaced from the plate 27 by the spacers 30 and 30'. The construction is such that the two parts of the templet 29—29' lie in the same plane and the applicator 28 for applying the foldline-forming means protrudes slightly from the plane of the exposed surface of the templet 29—29'. The edges of the templet are preferably beveled as indicated.

In my aforesaid copending application, I have described different foldline - forming means adapted to afford discontinuity of stiffness in the finished collar along the foldline of a one piece collar so that when the collar is laundered the collar top portion will turn down naturally with the foldline in the desired location. One such foldline-forming means consists of a tape which carries adhesive material, e. g., in the form of yarns or coating, and which may have one edge treated with resist material so as to prevent the so-treated edge from adhering to the lining ply of the collar. In the embodiment shown, the applicator 28 is adapted to receive and retain such a tape. The applicator is shown in the form of a bar which presents a central land portion 28a that is bordered on each side by the channels 28b, the channels 28b being below the level of land 28a but being brought up on the outer edges thereof to provide a certain amount of overhang as shown. In use, the foldline-forming means in the form of a strip or tape is slipped endwise underneath the overhang of the channels and is thereby held by the bar 28 in such a way as to prevent accidental displacement from its desired accurate location. The longitudinal extent and location of the bar 28 is shown in Fig. 4, the tape carried by the bar falling in the region of the collar band with one margin thereof along the desired position of foldline of a finished collar.

By virtue of the linkage by which the head 21 is carried, the templet 29—29' can be brought into and away from position with the templet in opposed relation to the surface of the bed 10. When the head is moved to the position shown in Fig. 1, the applicator 28 is exposed in such position that the operator can readily insert foldline-forming means therein. In a typical operation of the machine, the operator inserts the foldline-forming means into the applicator 28 when the head is up. He also may insert into the machine two collar plies, namely, the face ply and the lining ply in superimposed relation with the lining ply uppermost, the location of these plies on the bed plate 10 being determined by the gauging means 13. The lining ply may carry adhesive material adapted to be subsequently activated to form a "fused" collar, although the machine is also applicable in the production of so-called soft collars which do not have an adhesive-bearing lining.

Figure 2:
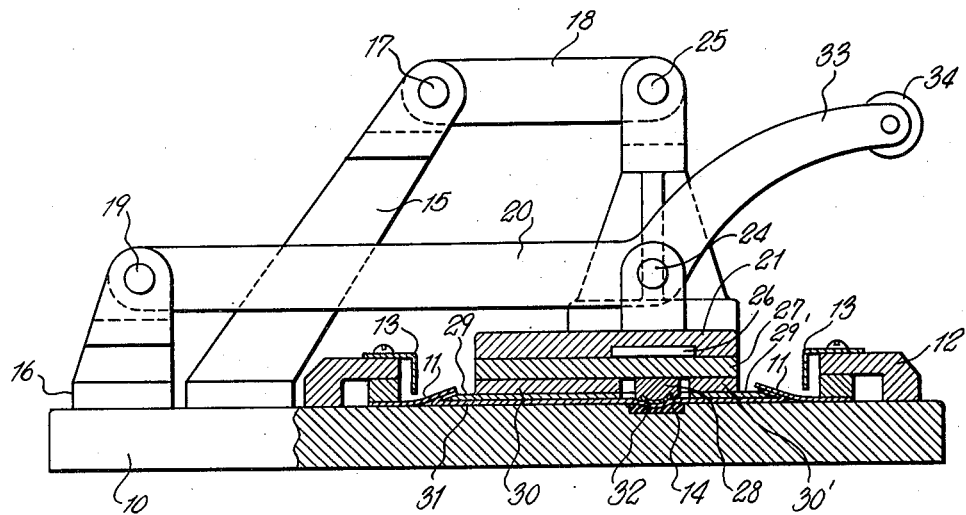
Fig. 2 is a similiar to Fig. 1 except that the apparatus is shown in closed position.
Figure 3:
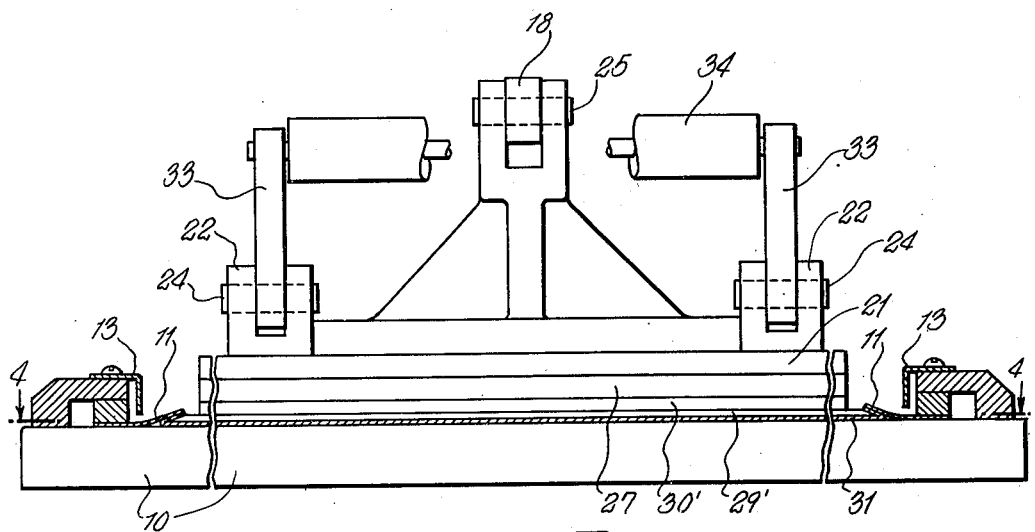
Fig. 3 is a front view of the apparatus shown in Figs. 1 and 2 with certain parts shown in section.

After the foldline-forming means has been inserted into the applicator 28 and after the two collar plies have been inserted into the machine as indicated at 31 (Fig. 1), the head is brought down so that the templet 29—29' makes contact with the work, the parts then occupying the position shown in Fig. 4, wherein the raw edges of the inserted collar plies 31 are indicated by the dot and dash line. As also indicated in Fig. 4, the edge portion of the templet 29—29' is shaped so as to conform to the finished contours of the collar. When the templet has been brought into position opposing the surface of the bed 10, the turning plates 11 are slid toward the templet 29—29' so as to turn the edge or margin portion of the collar plies over the edges of the templet and apply pressure to the turned edges, as indicated in Figs. 2 and 3. In this manner, the sliding of the turning plates 11 folds the marginal portion of the collar plies that protrudes beyond the edges of the templet with formation in the plies of a crease having the contour of the edges of templet 29—29'. As above mentioned, the folding of the marginal portion of the collar plies and the formation of a crease therein having the contour of the edges of the templet is well known in connection with the manufacture of collars by "machine turning" and mechanisms for so doing are well known. According to my invention, however, the operations above described have the further function of pressing the foldline-forming means, e. g., the tape above referred to, against the uppermost ply placed in the machine, this ply in the operation described being the lining ply. The foldline-forming means in the form of the tape is indicated at 32 in Fig. 2. Fig. 2 also shows how the strip 14 of yieldable resilient material in the bed 10 is adapted to become slightly compressed due to the pressure of the applicator 28 thereagainst when the machine is brought to the position shown in Fig. 2.

According to the operations described, it is seen that the foldline-forming means 32 is applied to the collar ply with which it is brought in contact so as to be accurately located in predetermined spaced relation to the edges of the templet 29—29' and in predetermined spaced relation to the crease formed in the collar plies when the marginal portion thereof is folded over the edges of the templet 29—29' by the action of the turning plates 11. Since the finished contours of the collar are determined by the crease formed along the margin of the collar plies, it is apparent that the foldline-forming means is accurately located in predetermined spaced relation to the finished collar contours so that the foldline as established by the foldline-forming means will occur in the desired predetermined location with reference to the contours of the finished collar.

The foldline-forming means as applied in the manner above described to the collar ply with which it is brought in contact may be caused to adhere thereto in any desired way and ordinarily this is accomplished by activating an adhesive carried by the foldline-forming means by means of heat. Thus the foldline-forming means may carry adhesive, e. g., in the form of yarns or as a coating, and to facilitate the activation of the adhesive the adhesive carried by the foldline-forming means is ordinarily plasticized. Under the influence of the heat and pressure when the machine is closed, the foldline-forming means will adhere to the collar ply with which it is brought in contact. The adhesion obtained in this way need be only temporary. Thus, if the collar is to be a "fused" collar permanent adhesion is subsequently achieved when the collar as a whole is "fused" for adhesively uniting the adhesive carrying lining ply with one or both of the other plies. On the other hand, if the collar is to be a soft collar, the tape or other foldline-forming means may be stitched to the collar plies after they have been removed from the machine.

After the marginal portion of the collar plies has been turned and creased and after the foldline-forming means has become adherently applied, the turning plates 11 are caused to retract thus freeing the head which may be moved back into the position shown in Fig. 1. Since the edges of the collar plies have been creased around the edge of the templet 29—29', the collar plies will cling to the templet and can be readily removed therefrom when the head is in the up position. After removal of the collar plies, a fresh tape is inserted into the applicator 28, fresh collar plies are placed on the bed of the machine and the operation is repeated.

When the finished collar is symmetrical, the back ply of the collar may be machine turned in the same machine, but with the applicator 28 removed since it is not necessary to apply foldline-forming means to the back ply when foldline-forming means has been applied to the lining ply.

The procedure above described may, if desired, be reversed, at least in some instances, namely, the foldline-forming means may be applied to the back ply instead of the lining ply.

After the folding and creasing operations have been performed on the face and lining plies and on the back ply with securement of foldline-forming means either to the lining ply or to the back ply in the manner above described, the plies may then be assembled with the folded margins turned under and with the plies in the proper registration with each other, and the plies thereafter may be stitched together along their folded contours to form the finished collar in the well-known manner. When the collar is to be used as an attached collar, the closure along the collar band may be modified so as to be appropriate for attachment to a shirt in any desired manner as well as understood by those skilled in the shirt making art.

While my invention has been described in connection with a preferred apparatus and in connection with a preferred method utilizing the apparatus, it is to be understood that this has been done merely for the purpose of illustration. Thus, the applicator may be modified from the particular form shown so as to be appropriate for the particular kind of foldline-forming means that is applied. If the foldline-forming means is of the kind above referred to which carries an adhesive and which carries a resist material along one edge thereof, the applicator is so positioned that the edge portion of the tape which carries the resist material will fall along the foldline of the finished collar, the balance of the tape falling along the collar band. If, on the other hand, the foldline-forming means is merely in the nature of a strip or tape which throughout has a stiffening effect in the finished collar, the applicator is so positioned that the strip or tape will fall along the collar band with one margin thereof immediately adjacent the foldline of the finished collar. It is also the case that the foldline-forming means may consist essentially entirely of resist material that is applied to the adhesive-bearing lining when the collar is of the "fused" type. For example, as described more in detail in my aforesaid copending application, the foldline-forming means may be in the form of a cord or a narrow band of tissue paper or a strip of cellophane or other similar material which is adapted to be made adherent to the lining ply but which is adapted to prevent adhesion of the back ply to the lining ply in the zone where the resist material is applied to the lining ply. In such case, the resist material is applied by the applicator so as to fall in a narrow zone extending along the foldline which is desired in the finished collar. In any such case, the applicator may be of any type suitable for carrying the foldline-forming material which in the finished collar affords means for determining the foldline in predetermined and accurate location with reference to the finished collar contours.

While the templet 29—29' has been shown as having an edge portion extending completely about the marginal extent of the work inserted in the machine, this is not essential. Thus, the edge of the templet may extend only partially about the peripheral extent of the collar. Ordinarily, the peripheral contours of the foldover or cape portion of the finished collar are of primary significance. Particularly, in the manufacture of a collar of the attached type, the benefits afforded according to this invention can be largely realized by utilizing the templet part 29 while omitting the templet part 29' as well as the turning plate that is adapted to function in relation to the templet part 29'. Even when such parts are omitted, it is apparent that the foldline-forming means as applied is accurately located in predetermined spaced relation to the finished contours of the foldover or cape portion of the collar as determined by the edge of the templet part 29. However, for accuracy in the formation of the band portion of a detached collar or for accuracy in the attachment of an attached collar to a shirt, it normally is preferable to crease the collar band part of the work as has been described hereinabove.

More generally, my invention is concerned with apparatus for the manufacture of a collar or other garment part which comprises in combination a templet having an edge portion of predetermined contour, means for folding the marginal portion of a fabric piece over the edge of the templet with formation in the fabric of a crease having the contour of the edge of the templet and means for applying a foldline-forming material to a portion of the fabric in predetermined spaced relation to the crease. According to the method of my invention, a marginal portion of at least one ply of a garment part, such as a collar, is folded over the edge portion of determined contour of a templet with formation of a crease in the ply having the contour of the edge, and foldline-forming material is applied to the ply in predetermined spaced relationship to such edge portion of the templet and to the crease that is formed in the ply when the marginal portion of the ply is folded over the templet edge.

It is apparent that, according to my invention, novel means and method are afforded whereby a garment part, such as a collar or the like, may be manufactured from a plurality of plies of fabric in such manner that the peripheral contours of the finished article are accurately predetermined, while at the same time foldline-forming means is effectively and economically incorporated in the article in accurately located position so as to be in predetermined spaced relationship to such peripheral contours.

I claim:

1. In apparatus for the manufacture of a collar or the like comprising in combination a templet member having a peripheral edge whose contour follows the desired contour of the foldover portion of the collar, a member presenting a surface adapted to oppose said templet member, means for bringing said templet member and said surface into and away from opposed relation with a collar ply having a foldover portion and a band portion therebetween leaving a margin of the foldover portion of the collar ply protruding from said edge and means for folding said protruding margin of said collar ply over said edge when said templet member and said surface are in opposed relation with formation of a crease in said ply having the contour of said edge; applicator means for applying to said collar ply foldline-forming material for providing permanent discontinuity of stiffness along the foldline between the band and foldover portions of the finished collar, said applicator means being carried by one of said members for establishing pressure contact with said collar ply in laterally fixed relation to said peripheral edge of said templet member when said members are disposed in said opposed relation with said collar ply therebetween and comprising means for receiving an elongated body of said foldline-forming material located on said applicator means in opposed relationship to the other member for presenting said elongated body of foldline-forming material in contact with said collar ply when said members are in said opposed relation with said collar ply therebetween in predetermined spaced relation to said peripheral edge of said templet member whereby said elongated body of foldline material is accurately located on transfer to said ply for providing said discontinuity of stiffness along said foldline in said predetermined spaced relationship to said crease.

2. Apparatus according to claim 1 wherein the other of said members comprises yieldable resilient means disposed to yieldably receive said applicator means in pressure contact thereagainst when said templet member and said surface are in said opposed relation.

3. Apparatus for the manufacture of a collar or the like comprising in combination a templet having a peripheral edge whose contour follows the desired contour of the finished collar, a support member presenting a surface adapted to oppose said templet and to support a collar ply placed therein, applicator means for carrying foldline-forming material substantially flush with the face of said templet opposed to said surface and in predetermined spaced relation to said edge, means for mounting said templet for reciprocatory movement between one position with said face of said templet in opposed relation to said surface of said support member and another position wherein said applicator means is made readily accessible for insertion of foldline forming material therein, gauge means carried by said support member adapted to locate a collar ply placed thereon so that a marginal portion thereof protrudes from said edge of said templet when said templet is moved into opposed relation to the surface of said member, and means for folding said marginal portion of said collar ply over said edge with formation in said ply of a crease having the contour of said edge when said templet and said surface of said member are in opposed relation, said means for mounting said templet for reciprocatory movement comprising a first member to which said templet is secured, a second member, pivot means for securing said first member to said second member and adapted to permit rocking of said first member and said templet secured thereto relative to said second member, mounting means for said second member adapted and arranged for mechanically controlled movement thereof to effect movement of the aforesaid pivot means comprised therein and said first member carried thereby toward and away from said surface, and means for effecting rocking movement of said first member and said templet secured thereto about said pivot means relative to said second member upon movement of second member from position with said templet essentially parallel to said surface when said templet is in opposed relation to said surface to position wherein said applicator means is readily accessible to the operator when said second member is moved to carry said templet away from said surface.

4. Apparatus according to claim 3 where said support member comprises yieldable resilient material disposed oppositely to said applicator means for yieldably receiving pressure exerted thereagainst by said applicator means when said templet and said surface of said member are in opposed relation.

5. In apparatus for use in the manufacture of a collar or the like comprising a member presenting a templet having a peripheral edge whose contour follows the desired finished contour of at least a portion of the collar, a second member presenting a surface adapted to oppose said templet, means for bringing said members into and away from opposed relation to permit the insertion and pressing between said templet and said surface of a collar ply disposed with a marginal portion thereof extending beyond said peripheral edge of said templet when said templet and said surface are in opposed relation and means for folding said marginal portion of said collar ply over said edge with formation in said ply of a crease having the contour of said edge when said templet and said surface are in opposed relation; applicator means for applying a foldline-forming tape to said collar ply, said applicator means comprising an elongated holder carried by one of said members adapted to marginally hold said tape and to press said tape against said ply in predetermined spaced relation to said edge when said templet and said surface are brought into opposed relation for pressing said collar ply therebetween.

6. In apparatus for use in the manufacture of a garment part comprising a templet having a peripheral edge of predetermined contour and presenting a pressing surface, a member presenting a surface adapted to oppose the pressing surface of said templet, means for effecting relative movement of said templet and said member into and away from position with said pressing surface of said templet pressed against said surface of said member, and means for folding a marginal portion of a fabric piece over said edge of said templet with formation of a crease therein having the contour of said edge when said surface of said templet is pressed against said surface of said member with said fabric piece therebetween; applicator means for applying to said fabric piece foldline-forming material adapted to produce permanent discontinuity of stiffness in said garment part along a desired location of a foldline, said applicator means being carried in an aperture in said templet in fixed lateral disposition relative to said edge of said templet and being adapted and arranged to receive said foldline-forming material and to present said foldline-forming material substantially flush with said pressing surface of said templet when said pressing surface of said templet is pressed against said surface of said member, thereby effecting contact of said foldline-forming material with said fabric piece for its transfer thereto upon pressing said fabric piece between said templet and said surface of said member.

7. Apparatus for use in the manufacture of collars or the like comprising a bed member adapted for disposition of a collar ply thereon, a movable member mounted for reciprocatory movement toward and away from said bed member, a templet, a supporting member to which said templet is secured, an applicator carried by said supporting member in an aperture in said templet, pivot means by which said supporting member is secured to said movable member, and means for rocking said supporting member about said pivot means relative to said movable member upon movement of said movable member toward and away from said bed member for effecting movement of said templet between essential parallel position relative to said bed member when said templet is moved so as to be opposite to said bed member and an outwardly turned position relative to said bed member at which said applicator is readily accessible to the operator when said templet is moved away from said bed member, said applicator being adapted to apply a foldline-forming material to said collar ply when said templet is in opposed relation to said bed member with said collar ply therebetween.

8. Applicator means for applying a foldline-forming tape to a fabric collar ply or the like comprising an elongated member having channel means therein which is adapted to receive a fabric tape and which comprises means coacting with the marginal edges of said tape to retain said tape in said channel means with the central area of said tape exposed, land means centrally disposed in said channel means adapted and arranged for presenting a backing against which a fabric tape disposed in said channel means can be pressed, and means adapted and arranged for pressing a fabric collar ply against said land means while said tape is disposed in said channel means between said fabric collar ply and said land means.

9. In a method of making a one piece collar having a band portion and a foldover portion and a foldline between said band and foldover portions and comprising a plurality of fabric plies, the steps comprising depositing on one of said plies a fabric tape with an edge thereof disposed along and adjacent said foldline and adapted to provide permanent discontinuity of stiffness along said foldline, pressing said tape against said collar ply with attendant affixation of said tape to said ply while said ply is held in fixed position between a backing and a templet having a marginal edge portion whose contour is according to the contour desired for the foldover portion of the finished collar, and while said ply is so held folding a marginal edge of said ply protruding from said edge portion of said templet over said edge portion of said templet with formation of a crease in said ply that has the contour of said edge and that is in predetermined location relative to said tape.

10. In a method of making a one piece collar having a band portion and a foldover portion and a foldline between said band and foldover portions from a plurality of fabric plies, the steps comprising pressing at least one of the plies between a templet having a marginal edge whose contour is according to contour desired for the foldover portion of the finished collar and an opposed surface leaving a margin of said ply protruding from said edge, while said ply is held in fixed position pressed between said templet and said surface depositing on said ply in adherent relation thereto a foldline-forming material that is held during its deposition on said ply in mechanically fixed location relative to said edge with an edge of the so-deposited foldline-forming material disposed along and adjacent said foldline and that is adapted to provide discontinuity of stiffness along said foldline in the finished collar, and while said ply is so held in said position folding said margin of said ply over said edge with formation of a crease in said ply having the contour of said edge; thereby providing in the finished collar a foldline about which the collar is adapted to be folded after laundering determined by the location of said foldline-forming material in accurate predetermined spaced relation with respect to the contour of the foldover portion of the finished collar determined by said crease.

BENJAMIN LIEBOWITZ.

References Cited in the file of this patent

UNITED STATES PATENTS

| Number | Name | Date |
|---|---|---|
| 46,291 | Bell | Feb. 7, 1865 |
| 1,620,986 | Thomas | Mar. 15, 1927 |
| 1,883,345 | Dixon | Oct. 18, 1932 |
| 2,108,199 | Gilbert | Feb. 15, 1938 |